United States Patent
Sachs et al.

(10) Patent No.: US 10,362,616 B2
(45) Date of Patent: Jul. 23, 2019

(54) SELECTION OF CAPILLARY NETWORK GATEWAY TO A CELLULAR NETWORK

(71) Applicant: Telefonaktiebolaget LM Ericsson (publ), Stockholm (SE)

(72) Inventors: Joachim Sachs, Sollentuna (SE); Nicklas Beijar, Kirkkonummi (FI); Anders E. Eriksson, Kista (SE); Ari Keränen, Helsinki (FI); Francesco Militano, Stockholm (SE); Johan Rune, Lidingö (SE); Vlasios Tsiatsis, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 169 days.

(21) Appl. No.: 15/119,907

(22) PCT Filed: Sep. 16, 2014

(86) PCT No.: PCT/SE2014/051069
§ 371 (c)(1),
(2) Date: Aug. 18, 2016

(87) PCT Pub. No.: WO2015/126302
PCT Pub. Date: Aug. 27, 2015

(65) Prior Publication Data
US 2017/0071024 A1 Mar. 9, 2017

Related U.S. Application Data

(60) Provisional application No. 61/942,769, filed on Feb. 21, 2014.

(51) Int. Cl.
*H04W 76/16* (2018.01)
*H04W 4/70* (2018.01)
(Continued)

(52) U.S. Cl.
CPC ............ *H04W 76/16* (2018.02); *H04W 4/70* (2018.02); *H04W 28/10* (2013.01); *H04W 48/17* (2013.01); *H04W 28/08* (2013.01)

(58) Field of Classification Search
None
See application file for complete search history.

(56) References Cited

U.S. PATENT DOCUMENTS 5,726,984 A * 3/1998 Kubler ............... B60R 16/0231
370/349
6,522,881 B1 * 2/2003 Feder .................... H04W 16/06
455/434

(Continued)

FOREIGN PATENT DOCUMENTS

EP 2 590 470 5/2013

OTHER PUBLICATIONS

"A Context-Aware Backhaul Management Solution for combined H2H and M2M traffic" by Prodromos Makris et al.; Department of Information & Communication Systems Engineering; University of the Aegean, Greece—2013.

(Continued)

*Primary Examiner* — Andrew Lai
*Assistant Examiner* — Jamaal Henson
(74) *Attorney, Agent, or Firm* — Patent Portfolio Builders, PLLC

(57) ABSTRACT

The present disclosure relates to the capillary network gateway selection in a capillary network. In particular, the present disclosure relates to a methods and arrangements for selecting a capillary network gateway, CGW, for linking of a machine device, MD, arranged to operate in a capillary network, to a cellular network. The cellular network is arranged to operate according to a radio access technology different from the radio access technology of the capillary (Continued)

network, the capillary network including a plurality of CGWs, each of which CGWs being adapted to forward traffic between the capillary network and a radio base station, RBS, of the cellular network. The method comprises, for at least two CGWs of the plurality of CGWs, to gather (S51) data related to cells of RBSs having a cellular radio connection to the respective CGW in the capillary network, and to control (S52) selection of at least one CGW out of the at least two CGWs based on the gathered data.

10 Claims, 7 Drawing Sheets

(51) Int. Cl.
*H04W 48/00* (2009.01)
*H04W 28/10* (2009.01)
*H04W 28/08* (2009.01)

(56) References Cited

U.S. PATENT DOCUMENTS

| | | | | |
|---|---|---|---|---|
| 2003/0202497 | A1* | 10/2003 | Csapo | H04W 16/00 370/338 |
| 2011/0213871 | A1* | 9/2011 | DiGirolamo | H04L 67/12 709/223 |
| 2013/0188515 | A1 | 7/2013 | Pinheiro et al. | |
| 2013/0242943 | A1 | 9/2013 | Zhou et al. | |
| 2013/0311640 | A1* | 11/2013 | Gleixner | H04W 4/70 709/224 |
| 2014/0153546 | A1* | 6/2014 | Kim | H04W 48/18 370/332 |
| 2015/0050954 | A1* | 2/2015 | Kameno | H04W 48/18 455/509 |

OTHER PUBLICATIONS

Draft ETSI TS 102 690 v<0.3.2>; Technical Specification; Machine-to-Machine communications (M2M); Functional architecture—Feb. 2010.

3GPP TS 23.682 v11.3.0; Technical Specification; 3rd Generation Partnership Project; Technical Specification Group Services and System Aspects; Architecture enhancements to facilitate communications with packet data networks and applications (Release 11)—Dec. 2012.

PCT Written Opinion of the International Searching Authority for the International Application No. PCT/SE2014/051069—Feb. 5, 2015.

International Search Report for International application No. PCT/SE2014/051069—dated Feb. 5, 2015.

* cited by examiner

SELECTION OF CAPILLARY NETWORK GATEWAY TO A CELLULAR NETWORK

PRIORITY

This nonprovisional application is a U.S. National Stage Filing under 35 U.S.C. § 371 of International Patent Application Serial No. PCT/SE2014/051069 filed Sep. 16, 2014, and entitled "Selection of Capillary Network Gateway to a Cellular Network" which claims priority to U.S. Provisional Patent Application No. 61/942,769 filed Feb. 21, 2014, both of which are hereby incorporated by reference in their entirety.

TECHNICAL FIELD

The present invention relates to capillary network gateway selection in a capillary network.

BACKGROUND

Future wireless communication systems are likely to comprise a large number of autonomous devices, which devices more or less infrequently transmit, receive, or are polled for small amounts of data. These devices are assumed to not necessarily be associated with humans but are rather sensors or actuators of different kinds, which communicate with application servers or similar network entities within or outside a cellular network.

This type of sporadic small data communication is often referred to as machine-to-machine, M2M, communication and the devices are often denoted machine devices, MDs. Examples of M2M applications are almost countless, e.g., in private cars for communicating service needs, in water or electricity meters for remote control and/or remote meter reading, in street-side vending machines for communicating when goods are out-of-stock or when enough coins are present to justify a visit for emptying, in taxi cars for validating credit cards, or in surveillance cameras for home or corporate security purposes. In the context of 3GPP standardization the corresponding alternative terms are Machine Type Communication, MTC, and Machine Type Communication, MTC, devices, the latter being a subset of the more general term user equipment, UE.

With the nature of MTC devices and their assumed typical uses follow that they will often have to be very energy efficient, since external power supplies will often not be available and since it is neither practically nor economically feasible to frequently replace or recharge their batteries. In some scenarios the MTC devices may not even be battery powered, but may instead rely on energy harvesting, i.e., gathering energy from the environment, opportunistically utilizing the often very limited energy that may be tapped from sun light, temperature gradients, vibrations, and the like.

So far the MTC related work in 3GPP and in other standardization projects has focused on MTC devices directly connected to the cellular network via the radio interface of the cellular network. However, a scenario which is likely to be more prevalent is one where most MTC devices connect to the cellular network via a gateway. In such scenarios the gateway acts like a UE towards the cellular network while also maintaining a local network, typically based on a short range radio technology, towards the MTC devices. Thus, the gateways are often equipped with communication modules or units which support both the radio access technology of the cellular network and the access technology of the local network, e.g. a radio access technology. Such a local network, which extends the reach of the cellular network to other radios outside the cellular network, has been coined capillary network. The gateway connecting or linking the capillary network to the cellular network will be herein referred to as a Capillary Network Gateway, CGW.

Radio technologies that are expected to be common in capillary networks include e.g. IEEE 802.15.4, e.g. with 6LoWPAN or ZigBee as the higher layers, Bluetooth Low Energy or low energy versions of the IEEE 802.11 family, i.e. Wi-Fi. A capillary network may be single hop, i.e. all MDs have a direct link to the CGW, e.g. a Wi-Fi network with the CGW as the access point, or multi-hop, i.e. some MDs may have to communicate via one or more other MDs to reach the CGW, e.g. an IEEE 802.15.4+ZigBee network with the CGW being a controller for a personal area network, PAN. In multi-hop cases the Routing Protocol for Low-Power and Lossy Networks, RPL, may be used.

Presently, in cases where there is a choice between several CGWs for linking an MD with a cellular network, the MD commonly selects CGW based only on propagation conditions between the MD and the CGW. That is, a measure of signal-to-noise ratio, SNR, or the like, is used to decide on a suitable CGW. Since present selection mechanisms based only on propagation conditions between the MD and the CGW can result in sub-optimal network traffic processing and overall degradation of aspects such as network control, improvements in the selection mechanism of CGWs are desired.

SUMMARY

It is an object of the present disclosure to provide methods and devices which seek to mitigate, alleviate, or eliminate one or more of the above-identified deficiencies in the art and disadvantages singly or in any combination and to provide embodiments enabling more efficient traffic processing and communication for a machine device, or a collection of machine devices, connected to a cellular network through a local area network such as a capillary network.

In particular, it is an object of the disclosure to provide embodiments for controlling selection of a capillary network gateway, CGW, linking the machine device to the cellular network.

This object is achieved by a method performed in a network node, a network node and a computer program run in the network node. The object is also achieved by a method performed in a machine device, a machine device and a computer program run in the machine device.

Said methods, node, device and computer programs are defined by the appended independent claims. Various advantageous embodiments are set forth by the appended dependent claims as well as by the following description and the accompanying drawings.

The disclosure presents a method, performed in a network node, of selecting a capillary network gateway, CGW, for linking of a machine device, MD, arranged to operate in a capillary network, to a cellular network, the cellular network being arranged to operate according to a radio access technology different from the access technology of the capillary network, the capillary network including a plurality of CGWs, each of which CGWs being adapted to forward traffic between the capillary network and a radio base station, RBS, of the cellular network. The method comprises, for at least two CGWs of the plurality of CGWs, to gather data related to cells of RBSs having a cellular radio connection to the respective CGW in the capillary network, and to control selection of at least one CGW out of the at least two CGWs based on the gathered data.

Consequently, the present disclosure improves on the CGW selection mechanisms in capillary networks compared to selection mechanisms based on, e.g., channel quality between MD and CGW alone, by taking additional information into account. In particular, information related to cells of RBSs having a cellular radio connection to a CGW in the capillary network is taken into account when causing the MD to link to the cellular network via at least one CGW. Thus, more efficient traffic processing and communication for a machine device, or a collection of machine devices, connected to a cellular network through a local area network such as a capillary network is obtained in that the link between MD and cellular network can be established via a suitable cell and RBS given the current state of both capillary network and cellular network.

According to an aspect of the disclosure, the step of controlling selection of the at least one CGW comprises selecting the at least one CGW out of the at least two CGWs based on the gathered data and providing information to the MD on the selected at least one CGW.

Thus, mechanisms for direct control over which CGW or CGWs an MD should link to is provided allowing external control of the CGW selection.

According to another aspect, the step of controlling selection of the at least one CGW comprises configuring in the MD a set of policies and/or rules governing a CGW selection by the MD. Thus, there is disclosed a mechanism which allows external control of the CGW selection by the MD via policies, which is an advantage.

Thus, a mechanism for indirect control over which CGW an MD should link to is provided, which is an advantage in that, e.g., a measure of autonomy of the capillary network is provided. For instance, the control signaling in the cellular network can be reduced since no direct control messaging to and from the MD from control entities in the cellular network is required every time the MD should connect to a new CGW.

According to a further aspect, the step of controlling selection of the at least one CGW further comprises sending at least a subset of the gathered data to the MD, whereupon the MD performs selection of the at least one CGW out of the at least two CGWs using said at least a subset of the gathered data and/or data retrieved by the MD as input data to the policies and/or rules.

The method further comprises the step of sending an instruction to the MD to connect or associate with the determined at least one CGW.

According to another aspect of the disclosure, the network node is a capillary network function, CNF, arranged to control CGWs of one or more capillary networks. Alternatively, the network node is an Operation and Maintenance, O&M, entity dedicated for CGWs, MDs, and/or for capillary networks. According to another option, the network node is a CGW.

According to an aspect, the data related to cells of RBSs having a cellular radio connection to a CGW in the capillary network comprises RBS cell traffic load, e.g. traffic load in one or more cells served by the RBS in which at least one of the plurality of CGWs in the capillary network is connected to the RBS or combined traffic load of all the cells served by the RBS.

Since the present teaching proposes taking traffic load of the cellular network cell in which the CGW is connected into account in the CGW selection, further advantageous effects are obtained. For instance, the present teaching allows an MD to select or be directed to a CGW which is connected to the least loaded cell among a group of cells, or to a cell with excess capacity, i.e., a cell which is not fully loaded in a group of otherwise fully or highly loaded cells. Thus, even more efficient traffic processing and communication for a machine device, or a collection of machine devices, connected to a cellular network through a local area network such as a capillary network is obtained.

According to a further aspect, the MD is arranged to operate according to a local area access technology in the capillary network and each CGW is arranged to operate according to a local area access technology in the capillary network and to operate according to a cellular radio access technology in the cellular network. Each CGW also has a cellular radio connection to a radio base station, RBS, of the cellular network. The step of gathering data comprises the step of, for each CGW, determining RBS cell related information for an RBS having a cellular radio connection to the CGW, the information being related to the cell in which the CGW is connected to the cellular network.

According to an aspect, the method further comprises the step of providing determined RBS cell related information of at least the other CGWs in the capillary network to each CGW.

According to an aspect, the method further comprises the step of providing information to the MD to set up a local area connection to a CGW based on the determined RBS cell related information.

According to an aspect, the step of gathering data related to the cells of the respective RBSs related to the cells of the respective RBSs having a cellular radio connection to one of the CGWs comprises obtaining the determined RBS cell related information of the other CGWs.

According to an aspect, the RBS cell related information includes RBS cell traffic load, e.g. traffic load in one or more cells served by the RBS in which at least one of the plurality of CGWs in the capillary network is connected to the RBS or the combined cell traffic load of all the cells served by the RBS.

As already noted above, due to the step of providing determined RBS cell related information of at least the other CGWs in the capillary network to each CGW, each CGW obtains information about current cellular network status, which information can serve as base for selecting a CGW for use in linking an MD to a cellular network.

According to an aspect, the step of determining RBS cell traffic load includes receiving RBS cell traffic load information from an operation and maintenance, O&M, entity.

Thus, a control mechanism is provided which enables the O&M entity to influence and simplify CGW selection, which is an advantage.

According to an aspect, the method further includes the steps of determining one or more dynamic properties for each CGW that is a candidate for selection in the capillary network, and providing the determined one or more dynamic properties for at least the other CGWs in the capillary network to each CGW, as well as selecting at least one CGW out of the at least two CGWs based on a combination of the RBS cell related information and the determined one or more dynamic properties, and also providing information to the MD on the selected at least one CGW, thereby enabling the MD to link to the cellular network via the at least one selected CGW by setting up a local area connection to the selected CGW.

Thus, by including the steps of determining one or more dynamic properties for each CGW and selecting at least one CGW out of the at least two CGWs based on a combination of the RBS cell related information and the determined one or more dynamic properties the MD can select or be directed to the CGW which will provide the most efficient traffic processing and forwarding, which is an advantage.

According to an aspect, the one or more dynamic properties comprises any of traffic load experienced by each CGW, channel quality of the cellular radio connection for the CGW, and cellular radio access technology of the CGW connection to the cellular network.

Consequently, the present disclosure improves on the CGW selection mechanisms in capillary networks by taking additional information into account when making the CGW selection decision compared to selection mechanisms based on, e.g., channel quality between MD and CGW alone. It also enables the network to have more control of the MD's choice of CGW, enabling steering of MDs to CGWs with suitable combination of load, cellular radio channel quality and/or cellular radio access technology, RAT, which will enable more efficient processing and forwarding of traffic to and from the capillary network.

According to an aspect of the disclosure, the policies for CGW selection are based on MD application parameters.

According to another aspect of the disclosure, the instructions are provided in a field in an RPL message, in a link layer message or in a unicast IPv6 router advertisement.

Objects of the disclosure are further obtained by a network node arranged to select a capillary network gateway, CGW, for linking a machine device, MD, arranged to operate according to a local area access technology in a capillary network including a plurality of CGWs, to a cellular network. The network node comprises a processor, a communication interface, and a memory. The memory contains instructions executable by said processor, whereby the network node is operative to, for at least two CGWs of the plurality of CGWs, gather data related to cells of the RBSs having a cellular radio connection to the respective CGW in the capillary network, and control selection of at least one CGW out of the at least two CGWs based on the gathered data.

According to an aspect, the network node is a capillary network function, CNF, and the network node further includes a communication interface to at least one operation and maintenance, O&M, entity.

The disclosure also presents a computer-readable storage medium, having stored thereon a computer program which when run in a network node, causes the network node to perform the disclosed method.

The network node and the computer-readable storage medium each display advantages corresponding to the advantages already described in relation to the method performed in the network node.

Objects of the disclosure are also obtained by a method, performed in a machine device, MD, arranged to operate according to a local area access technology in a capillary network, of selecting a capillary network gateway, CGW, for linking the MD to a cellular network, wherein the capillary network includes a plurality of CGWs. Each CGW is arranged to operate according to a local area access technology in the capillary network and to operate according to a cellular radio access technology in the cellular network. Each CGW has a cellular radio connection to a radio base station, RBS, of the cellular network. The method comprises receiving an instruction from a network node to select at least one CGW based on data gathered related to cells of RBSs having a cellular radio connection to the respective CGW in the capillary network. The method further comprises selecting the at least one CGW and setting up a local area connection to the at least one CGW.

According to an aspect of the disclosure, the step of receiving an instruction from the network node comprises receiving a set of policies and rules governing CGW selection by the MD and receiving at least a subset of the gathered data from the network node.

According to an aspect of the disclosure, the method in the MD further comprises the step of, for each CGW, retrieving RBS cell related information for the RBS having a cellular radio connection to the CGW, the information being related to the cell in which the CGW is connected to the cellular network.

According to another aspect, the retrieved cell related information for the RBS is the cell traffic load.

According to another aspect of the disclosure, the step of retrieving further includes retrieving one or more dynamic properties for each CGW, and the step of selecting a CGW is based on a combination of the RBS cell related information and the one or more dynamic properties.

According to an aspect of the disclosure, the one or more dynamic properties comprises load experienced by each CGW, channel quality of the cellular radio connection for the CGW and/or cellular radio access technology of the cellular network.

According to an aspect of the disclosure, the step of setting up a local area connection to a CGW comprises receiving instructions from a network node to set up the connection to a specified CGW.

According to another aspect of the disclosure, the step of setting up a local area connection to a CGW comprises from a network node on how to select a CGW.

According to another aspect of the disclosure, the step of setting up a local area connection to a CGW is based on one or more policies for CGW selection stored in the MD.

According to an aspect of the disclosure, the one or more policies for CGW selection include a policy based on MD application parameters.

Objects of the disclosure are also obtained by a machine device, MD, arranged to select a capillary network gateway, CGW, for linking the machine device to a cellular network, the MD operating according to a local area access technology, RAT, in a capillary network comprising a plurality of CGWs. The MD comprises a processor, radio circuitry and a memory. The memory contains instructions executable by said processor whereby the network node is operative to receive an instruction from a network node to select at least one CGW based on data gathered related to cells of RBSs having a cellular radio connection to the respective CGW in the capillary network; to select the at least one CGW; and to set up a local area connection to the cellular network via the at least one selected CGW.

The disclosure also presents a computer-readable storage medium, having stored thereon a computer program which when run in a machine device, MD, causes the MD to perform the disclosed method.

The method in a machine device, the machine device and the computer-readable storage medium each display advantages corresponding to the advantages already described in relation to the method performed in the network node.

BRIEF DESCRIPTION

FIG. 1 schematically discloses a basic LTE architecture;
FIG. 2 schematically discloses a capillary network principle;
FIG. 3 exemplifies a capillary network deployment;

FIG. 4 schematically discloses a capillary network application example;

Figure 1:
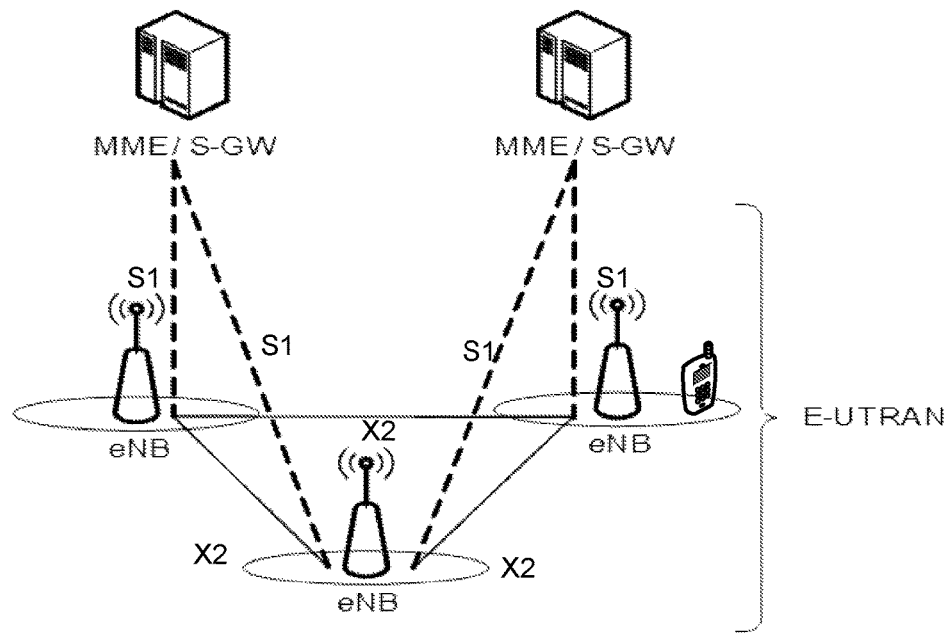

ABBREVIATIONS 2G 2nd generation
3GPP 3rd Generation Partnership Project
6LoWPAN IPv6 over Low power Wireless Personal Area Networks
AAA Authentication, Authorization and Accounting
AS Application Server
CDMA Code Division Multiple Access
CGW Capillary Network Gateway
CNF Capillary Network Function
eNB eNodeB
eNodeB Evolved NodeB/E-UTRAN NodeB
E-UTRAN Evolved Universal Terrestrial Radio Access Network
GGSN Gateway GPRS Support Node
GPRS General Packet Radio Service
HPLMN Home PLMN
HSPA High Speed Packet Access
HSS Home Subscriber Server
IEEE Institute of Electrical and Electronics Engineers
IP Internet Protocol
IPv6 Internet Protocol version 6
LTE Long Term Evolution
M2M Machine-to-Machine
MD Machine Device
MME Mobility Management Entity
MSC Mobile Switching Center
MTC Machine Type Communication
MTC-IWF Machine Type Communication Interworking Function
O&M Operation and Maintenance
PAN Personal Area Network
PDN Packet Data Network
P-GW PDN Gateway
PLMN Public Land Mobile Network
RAN Radio Access Network
RAT Radio Access Technology
RBS Radio Base Station
RPL Routing Protocol for Low-Power and Lossy Networks
SCS Services Capability Server
SGSN Serving GPRS Support Node
S-GW Serving Gateway
TS Technical Specification
UE User Equipment
VPLMN Visited PLMN
WCDMA Wideband Code Division Multiple Access
Wi-Fi Wi-Fi refers to a set of features defined by the Wi-Fi Alliance, which are based on the IEEE 802.11 family of radio technologies. A Wi-Fi certified device is a device that has successfully completed the Wi-Fi Alliance interoperability certification testing.

DETAILED DESCRIPTION

Aspects of the present disclosure will be described more fully hereinafter with reference to the accompanying drawings. The methods and wireless device disclosed herein can, however, be realized in many different forms and should not be construed as being limited to the aspects set forth herein. Like numbers in the drawings refer to like elements throughout.

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The terminology used herein is for the purpose of describing particular aspects of the disclosure only, and is not intended to limit the disclosure to any particular embodiment. As used herein, the singular forms "a", "an" and "the" are intended to include the plural forms as well, unless the context clearly indicates otherwise.

It is an object of the present disclosure to provide embodiments for controlling a selection of a capillary network gateway, CGW, linking a machine device to the cellular network, thereby enabling more efficient traffic processing and communication when the machine device is connected to a cellular network through a local area network, such as a capillary network. As mentioned above, control mechanisms for selection of one out of multiple CGWs that are available to a MD is an area in which solutions have been lacking.

In the present disclosure, a connection in the local area network is presented as a local area connection. This type of connection is typically a radio connection, i.e. a local area radio connection, but could also be established by non-radio means, e.g. by infrared light or by physical wires. Similarly, in the capillary network a local area access technology is used. The local area access technology is usually a local area radio access technology, but other access technologies are also within the scope of the disclosure.

In the context of the present disclosure, traffic load may comprise any of user data traffic traffic load, i.e. user plane load, signaling traffic load, i.e. control plane load, or any combination thereof.

In the present disclosure, a machine device represents a device that sporadically transmits, receives, or is polled for small amounts of data. In the present disclosure, machine devices have been exemplified by non-manually operated sensor or actuator of different kinds, which communicate with application servers or similar network entities within or outside a cellular network. However, in the context of the present disclosure the term machine device does not exclude manually operated devices, e.g. devices that are temporarily introduced into the capillary network by a service technician temporarily connecting a laptop or other entity to a capillary network during maintenance tasks.

In the context of the disclosure, a policy implies a proposed or suggested principle of action, while a rule implies a mandatory principle of action.

FIG. 1 schematically discloses a basic LTE architecture where a plurality of RBSs, here shown as eNBs, is connected to MME/S-GW entities via S1 interfaces. The eNBs are connected to each other via X2 interfaces. The architecture shown in FIG. 1 may, e.g., be used for transporting data from machine devices, MDs, in a capillary network to an application server.

Figure 2:
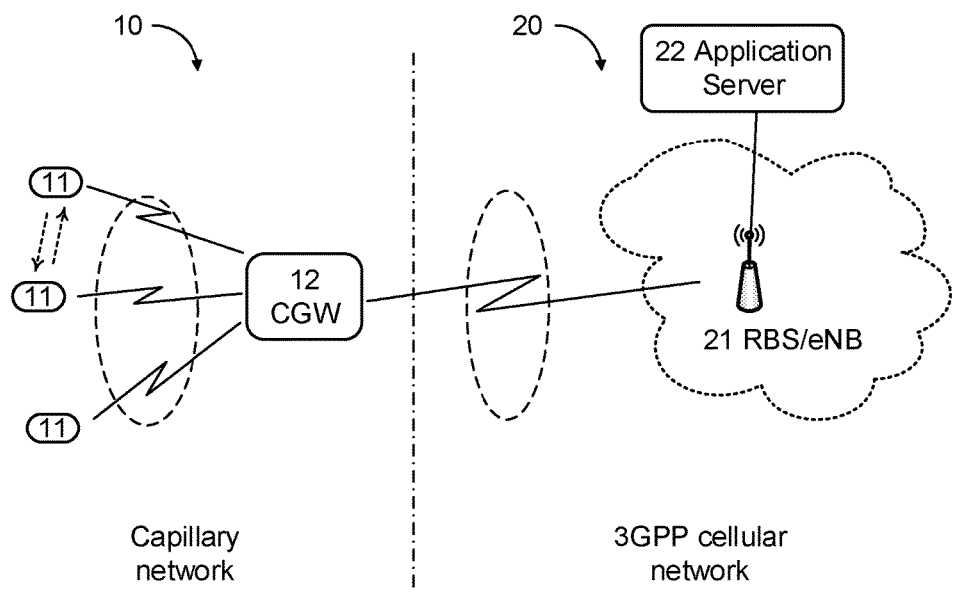

FIG. 2 schematically discloses a capillary network principle wherein machine type devices 11 operate in a local area network 10. The local area network, hereinafter also denominated as a capillary network, has an interface to a cellular network 20, e.g. a 3GPP cellular network, by means of one or more capillary network gateways, CGWs 12, here illustrated as one CGW 12. The CGWs each provides a link from the capillary network to the cellular network and consequently also a link from a machine device, MD, 11 to the cellular network 20 via the CGW 12. The CGW has a communication link to a radio base station, RBS, 21 of the cellular network 20. Thus, the CGW communicates with the RBS in the same manner as any other type of user equipment, UE, having a radio link connection to the RBS. In fact, a connected UE is, according to aspects of the disclosure, configured to act as a CGW in the capillary network, whereupon the CGW properties are included as a capability in UE capability information elements provided to the RBS. The CGW also maintains a local area network connection toward the MDs 11, typically based on short range radio technology, e.g. Wi-Fi. An application server 22 connected to the cellular network, e.g. directly connected to the cellular network (for example operated by the operator of the cellular network) or connected to the cellular network via the Internet, receives messages from the machine devices 11, e.g. reports on measurements performed by the MDs 11. In the context of the disclosure, the cellular network is capable of controlling the CGWs, irrespective of whether the cellular network operator or some other party, such as the owner/operator of the capillary network, owns the CGW.

Figure 3:
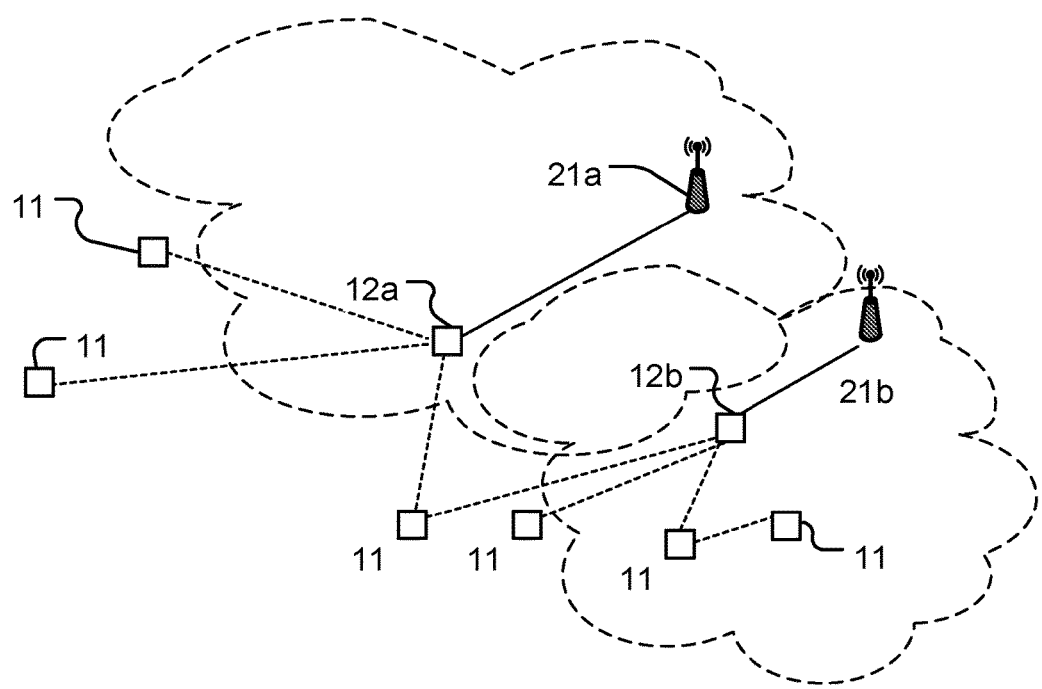

FIG. 3 exemplifies a capillary network deployment including a plurality of MDs 11 connected via a local area access technology, RAT, of the capillary network to the CGWs 12a, 12b which in turn are connected to respective radio base stations, RBSs, 21a, 21b of a cellular network. The following disclosure is based on the assumption of a capillary network according to the basic principles illustrated in FIG. 3, where a MD, at least from a capillary network deployment perspective, is capable of setting up a link to the cellular network by means of multiple CGWs and where a selection of CGW should be performed prior to establishing the link. As exemplified in FIG. 3, a MD 11 is capable of having multiple local area connections, e.g. one local area connection to a first CGW 12a and another local area connection to a second CGW 12b. The following disclosure is applicable to the situation of selecting one CGW for linking the MD to a cellular network, but also to the situation of selecting two or more CGWs for providing the link.

According to an aspect the CGWs are equipped to communicate using the two different radio access technologies in parallel.

According to an aspect the CGWs are equipped to only communicate using one radio access technology at the time, communication hardware of the CGW such as power amplifiers being used for both radio access technologies in order to conserve any of footprint, energy consumption, or production cost.

Figure 4:
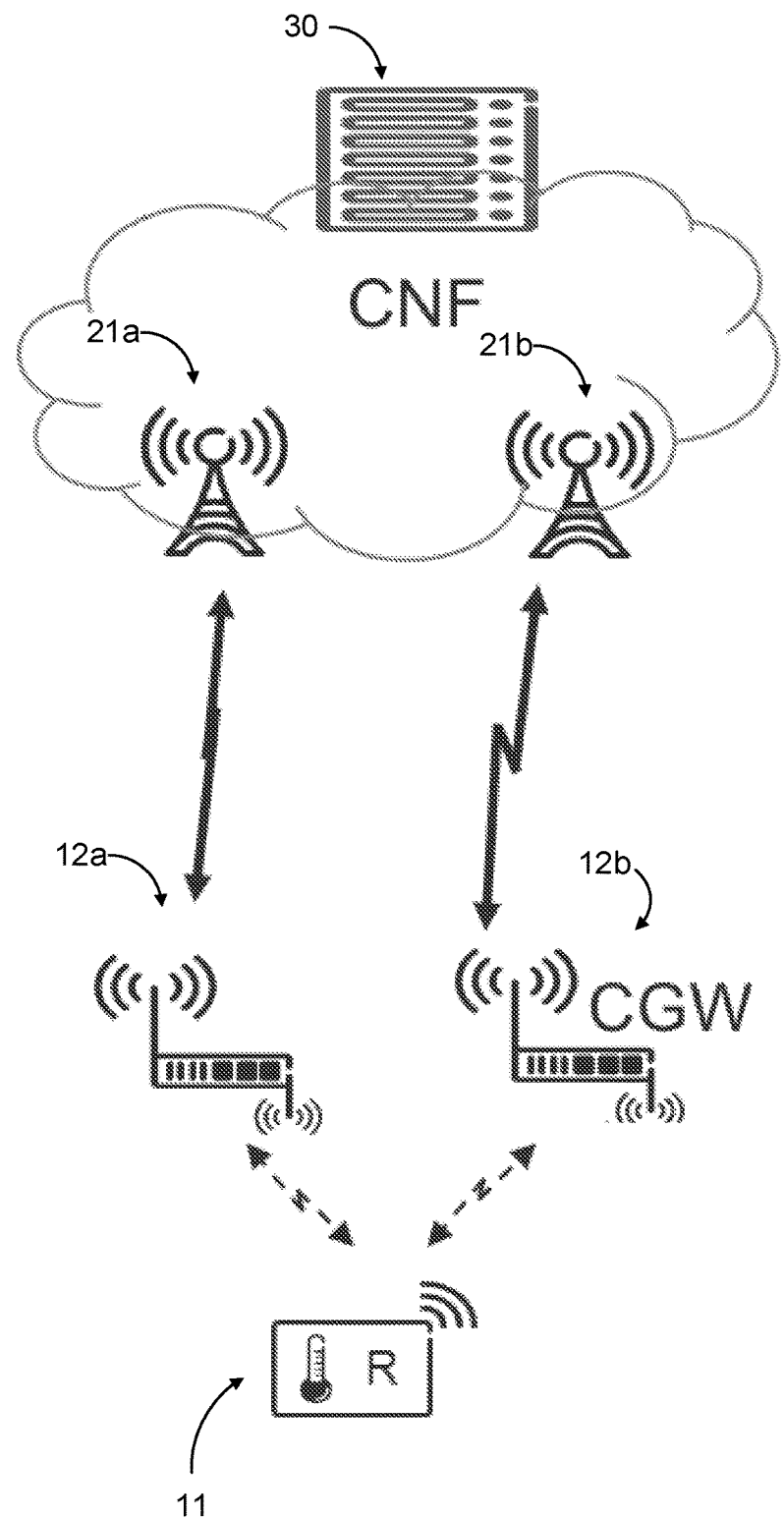

FIGS. 4 schematically disclose a capillary network application example. Here, at least one machine device 11 is used for reading temperature. The MDs are either connected directly, or, in the case several MDs are present, both directly and indirectly via another MD, to CGWs 12a, 12b. The CGWs, in turn, are connected to RBSs 21a, 21b, of a cellular network.

There is also shown a Capillary Network Function, CNF, 30, which is used to control CGWs and/or one or more capillary networks and/or machine devices, MDs. The functions of the CNF, in the context of this disclosure, will be further discussed below.

Radio technologies that are expected to be common in capillary networks such as the capillary networks shown in FIGS. 2-4 include e.g. IEEE 802.15.4, with 6LoWPAN or ZigBee as the higher layers, Bluetooth Low Energy or low energy versions of the IEEE 802.11 family, i.e., Wi-Fi. A capillary network may be single hop where all MDs have a direct link to a CGW, e.g., a Wi-Fi network with the CGW as the access point, or multi-hop where some MDs may have to communicate via one or more other MD(s) to reach the CGW, e.g., an IEEE 802.15.4+ZigBee network with the CGW being a PAN controller. In multi-hop cases the Routing Protocol for Low-Power and Lossy Networks, RPL, is, according to aspects, used. In principle RPL may be used also in single hop networks, but there is no need for a routing protocol in such networks.

It is noted in FIGS. 3-4 that some MDs 11 has a choice between at least two CGWs 12a, 12b, which can both be used to link to the cellular access network, possibly also to different RBSs 21a, 21b, or different cells belonging to the same RBS, in the cellular network. Consequently, there can arise a need to choose between the at least two CGWs. Furthermore, this choice of CGW is likely to affect performance of the overall communication system, including both capillary and cellular network.

Presently, in cases where an MD is presented with a choice between several CGWs for linking into a cellular network, the MD commonly selects CGW based on propagation conditions between the MD and the CGW alone, e.g. signal-to-noise ratio, SNR, or a measure of received power. However, this type of channel quality metric only reflects the state of the link between MD and CGW, and not the state of the overall communication system. Thus, present selection mechanisms can result in sub-optimal traffic processing and overall degradation of aspects such as network control.

In order to overcome deficiencies in the art and disadvantages, the present disclosure proposes to also take radio base station, RBS, cell related information into account when selecting a CGW for the purpose of linking an MD to a cellular network.

An example of such RBS cell related information is the traffic load in the cellular network cell to which the CGW is connected, i.e., the cell traffic load experienced by the RBS with which the CGW is connected. This will allow the MD to select or to be directed to a CGW which is connected to the least loaded cell among a group of cells.

In addition to being beneficial for the MD itself, this feature is according to aspects also used for load balancing between cells in the cellular network. Thus, load balancing can be achieved by distributing or re-distributing MD to CGW connections in order to reduce or increase the number of MDs linking into a cellular network via a given CGW and RBS.

Aspects of the present disclosure which are detailed below comprises ways to collect, distribute and transfer relevant information, such as cell traffic load (that is the traffic load in a cell as experienced by the RBS serving the cell) or RBS traffic load (that is the total traffic load experienced by an RBS involving all the cells served by the RBS), among the involved entities, i.e., MD, CGW, RBS, and network control functions, in order to enable a selecting of a suitable CGW, and also to enable the selection decision to be made in different places throughout the communication system depending on application. That is, by the present teaching, CGW selection can be made by the CNF, the CGW, by the MD alone, or by the MD under the influence of policies and/or rules set by a network operator.

Consequently, aspects of the present disclosure detailed below further comprises mechanisms by which the network can exercise direct or indirect control over the MD's selection of CGW to use for linking with a cellular network, either through explicit instructions or indirectly through policies and contextual parameters.

According to aspects, a plurality of different properties which may be associated with a CGW are relevant for impacting the choice of CGW for a MD. One such property, as mentioned above, is the traffic load in the cellular network cell with which the CGW is connected, i.e., the traffic load experienced by the RBS to which the CGW maintains a connection using the radio access technology of the cellular network.

Even though the MD itself is the entity which eventually executes the CGW selection, i.e., which actually establishes a connection using the radio access technology of the capillary network to the selected CGW, the network is according to aspects operable to maintain a level of control over the MD's choice. According to such aspects, this control comprises use of explicit instructions, use of policies/rules based on contextual input parameters, and use of modification of contextual parameters that indirectly affect the MD's choice of CGW.

This wide variety of choice of controls, i.e., direct by instructions to the MD, or indirect by use of policies/rules based on contextual input parameters, or based on use of modification of contextual parameters is an advantage of the present teaching.

The above listed information, i.e., the data related to cells of the respective RBSs or the RBS cell related information that is to serve as input data to the CGW selection has to be gathered somehow before an informed selection of CGW can be made. Depending on how and by which entity the selection decision is made and the way the network exercises its control over the MD's CGW choice, the information gathering may be performed in different ways and by different entities according to different aspects of the present teaching.

Figure 5:
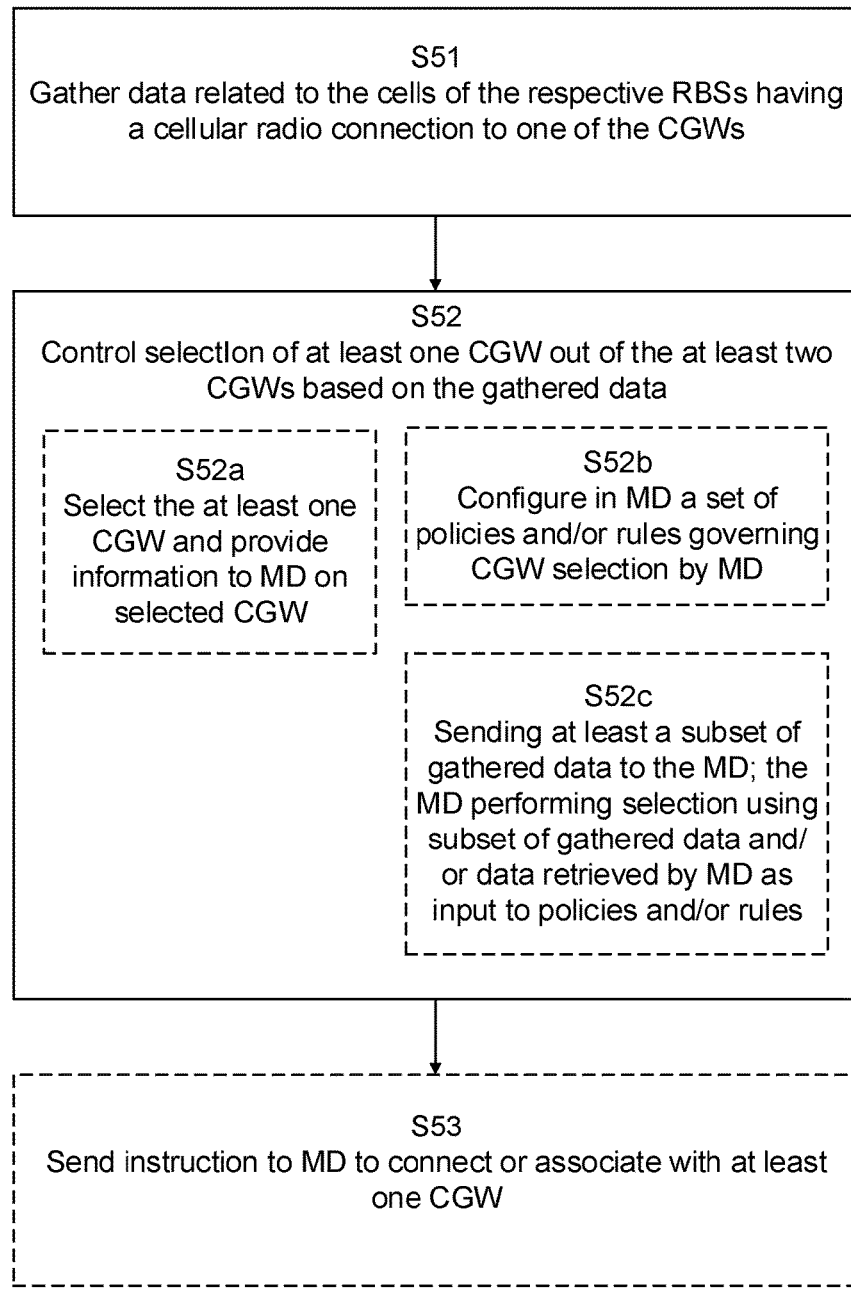
FIG. 5 is a flowchart schematically illustrating embodiments of method steps performed in a network node

FIG. 5 is a flowchart schematically illustrating embodiments of method steps performed in a network node for selecting a capillary network gateway, CGW, for linking a machine device, MD, to a cellular network. The MD is arranged to operate according to a local area access technology in a capillary network including a plurality of CGWs, in FIG. 3 illustrated as two CGWs. Each CGW is arranged to operate according to a local area access technology in the capillary network and to operate according to a radio access technology in the cellular network. Furthermore, each CGW has a cellular radio connection to a radio base station, RBS, of the cellular network. Note that in the context of this disclosure the term radio access technology is not limited to one of the "main types" of radio access technologies, such as LTE, HSPA, WCDMA, 2G/GPRS, CDMA2000 or Wi-Fi, but may also include more granular information, such as supported 3GPP release, maximum data rate, etc.

The network node performing the disclosed method could be a CGW, a new logical network entity, here denoted Capillary Network Function, CNF, an Operation and Maintenance, O&M, entity, any combination of these entities or any other type of node entity capable of observing traffic related metrics in the capillary network, the interface between a capillary network and a cellular network or in the cellular network.

The network node gathers in step S51, for at least two CGWs of the plurality of CGWs, data related to cells of RBSs having a cellular radio connection to a respective CGW in the capillary network. Based on the gathered data, the network node controls selection in step S52 of the at least one CGW out of the at least two CGWs.

It is noted that the at least two CGWs can be connected to the same RBS, or to different RBSs. It is also noted that a CGW can be connected to more than one RBS. It is further noted that all CGWs are not necessarily connected to any RBS at all.

According to an aspect, the disclosure further comprises selecting, in step S52a, the at least one CGW out of the at least two CGWs based on the gathered data and providing information to the MD on the selected at least one CGW.

In accordance with another option, the step of controlling selection of the at least one CGW comprises configuring a set of policies and/or rules governing CGW selection in the MD, so that the MD following the configuration has a capability to perform the selection of CGW. In accordance with an aspect of the disclosure, the selecting in the MD is further assisted by data received from the network node, i.e. the network node sending in step S52c at least a subset of the gathered data to the MD to use in the selection process, and/or data retrieved by the MD to use as input to the configured policies and/or rules.

Another optional step S53 comprises sending an instruction to the MD to connect to or associate with the determined at least one CGW.

According to an aspect, the step of controlling selection of the at least one CGW includes causing the MD to link to the cellular network via the at least one selected CGW based on the gathered data; using a set of policies and/or rules configured in the MD and governing CGW selection by the MD.

According to an aspect, the network node is a capillary network function, CNF, arranged to control CGWs of one or more capillary networks. The CNF may also be used to control the one or more capillary networks and/or machine devices, MDs, of the capillary networks.

Consequently, and as noted above in connection to FIG. 4, certain aspects of the present disclosure involves and makes use of a novel network entity denoted Capillary Network Function, CNF. The CNF could be a part of the capillary network or the cellular network.

The CNF is according to one aspect arranged above the SGi interface of the cellular network, which cellular network here is exemplified by an LTE cellular network, and is further assumed to be reachable from the CGW via the user plane. The CNF also, according to aspects, has one or more interfaces to one or more Operation and Maintenance, O&M, entities, e.g. O&M entities dedicated for the CGWs, the MDs and/or the capillary networks.

According to an aspect, the location of the CNF is in the services capability server, SCS. I.e., the CNF is a part of the SCS standardized by 3GPP 29.368, version 11.4.0. Herein, the CNF is assumed to be part of the cellular network, or, according to an alternative, to be part of the capillary network.

According to another aspect the CNF is deployed as a separate entity, i.e., not part of an existing entity such as the SCS.

According to an aspect, the CNF is configured to handle tasks related to the capillary network, in particular configuration and/or control of the CGW or CGWs.

According to an aspect the CNF is further configured to participate in processing of traffic related to the capillary network or networks.

According to an aspect, the network node is an O&M entity, which may be dedicated for CGWs, MDs, and/or for capillary networks, or may be a more generic O&M entity used for operation and maintenance of other entities too, in addition to CGWs, MDs and/or capillary networks.

According to an aspect, the network node is a CGW.

According to an aspect, the data related to cells of the respective RBSs comprises RBS traffic load, e.g. the traffic load experienced by the RBS in the cell in which the CGW is connected or the total traffic load experienced by the RBS in all the cells it serves.

According to an aspect, the MD is arranged to operate according to a local area access technology in the capillary network and each CGW is arranged to operate according to a local area access technology in the capillary network and to operate according to a cellular radio access technology in the cellular network. Each CGW also has a cellular radio connection to a radio base station, RBS, of the cellular network. The step of gathering S51 data comprises the step of, for each CGW, determining RBS cell related information for an RBS having a cellular radio connection to the CGW, in particular information related to the cell in which the CGW is connected to the RBS, and also the step of providing determined RBS cell related information of at least the other CGWs in the capillary network to each CGW.

As noted above, according to the disclosure, the network exercises its control over the CGW selection process through explicit instructions to the MD. The network exercises its control over the MD's choice of CGW through explicit instructions to the MD, such as an instruction to the MD to connect/associate with another CGW, or to remain with the current CGW. The instruction may be sent to the MD by the MD's current CGW or possibly by the CNF directly to the MD, for example addressed directly to the MD but forwarded by intermediate entities such as the RBS and the CGW, or even indirectly via some other network node of the capillary or cellular network. Thus, a network entity other than the MD is configured to control selection of at least one CGW, i.e. a CGW eligible for linking the MD to the cellular network, based on the gathered data.

According to another aspect, the network entity configured to execute the step of controlling selection S52 is the CGW currently selected by the MD, i.e. the CGW the MD is currently connected to/associated with.

Providing information to the MD about the selected at least one CGW during step S52a, comprises providing information based on the determined RBS cell related information.

According to yet another aspect, the network entity configured to execute the step of selecting S52 is the CNF.

As mentioned above, the information that is relevant for the CGW selection has to be gathered. The cell traffic load is inherently known by the RBS in control of the cell (and the RNC in case of a 3G/WCDMA/HSPA network). Hence, the RBS (or possibly RNC) will be a main source of the relevant information. However, the methods for the actual acquisition and/or distribution of this information depend on the solution variants and the involved nodes/entities.

Thus, according to an aspect, the relevant information for CGW selection, i.e., the data related to a cell of an RBS having a cellular radio connection to a CGW in the capillary network, is obtained directly from the RBS.

According to one aspect the CNF gathers the cell traffic load information from the RBSs (e.g. LTE eNBs).

The CNF may have a direct interface to the RBSs, e.g. an O&M interface, or may retrieve the information via the MTC-IWF and the MME/SGSN/MSC.

Thus, according to an aspect, the CNF is configured to gather the cell traffic load information, in particular information related to the load in each cell to which at least one of the selectable CGWs is connected (e.g. at least one of the CGWs in the capillary network), from the RBSs having a cellular radio connection to at least one CGW in the capillary network;

via a direct interface to the RBSs, e.g. an O&M interface, or via the MTC-IWF and the MME/SGSN/MSC.

The CNF knows which RBSs and which cells to request the load information from based on prior information. For instance, the CNF may have received this information from the respective CGW, e.g., in conjunction with the deployment of the CGW and/or possibly later in the form of update messages. The CNF may also have received the information about the cell and RBS a CGW is connected to from an O&M entity, e.g. an O&M entity dedicated for management of capillary networks or CGWs. The information may also be pre-configured, e.g. manually, in the CNF in conjunction with deployment of the respective CGW. Yet another alternative is that the CNF acquires the information about which cells to request load information for from the respective RBS, or possibly RNC, that is in control of at least one cell in which at least one of the CGWs in the capillary network is connected. In the case where the RBS provides this information, an option is that the RBS, or possibly RNC, proactively and unsolicited sends the load information to the CNF, i.e. without a preceding request. Another option is that the CNF sends a single request to the RBS, or possibly RNC, requesting it to regularly provide the load information, or to provide it whenever it changes significantly, e.g. changes more than a specified amount, possibly rate limited to prevent too excessive signaling. According to an aspect of the disclosure, a UE connected to the RBS is acting as a CGW. One means to make a RBS, or RNC where applicable, aware of that the connected UE is acting as a CGW involves including the CGW role, and possibly even information about the capillary network to which it is connected, as one of the UE capabilities that the CGW sends to the network, i.e. extending the currently existing means for a UE to provide capability information to the network, e.g. UE radio network capabilities or UE network capabilities.

Thus, according to an aspect, the CNF is pre-configured with information relating to which RBSs and which cells to request the load information from, or the CNF is arranged to receive information about the cell and RBS a CGW is connected to from an O&M entity. According to another aspect, the CNF is arranged to receive information about the cell and RBS a CGW is connected to from the respective CGW or, alternatively, from the respective RBS.

In the case where the information is provided by an O&M entity, this O&M entity may in turn have acquired the information in conjunction with deployment of the CGW, or from the CGW at a later occasion, or through configuration. As previously presented, an alternative way for the CNF to retrieve cell traffic load information is that it is pre-configured with this information. In case the cell traffic load information is required by the CGWs in the capillary network, the CNF would distribute the gathered cell traffic load information to CGWs connected to the capillary network.

Thus, according to an aspect, the CNF is adapted to distribute the gathered cell traffic load information to CGWs connected to the same capillary network.

It would also be possible to let an O&M entity, e.g., an O&M entity dedicated for management of capillary networks or CGWs gather the cell traffic load information from the RBSs and distribute it to the CGWs connected to the same capillary network.

In yet another variant, the RBS transmits cell traffic load information to the CGW. This may be done as part of the system information, which is broadcast to all UEs in the cell, or as a dedicated message to the CGW, e.g. on request from the CGW. The CGWs would then exchange the cell traffic load information with each other, e.g. across the capillary network.

Consequently, according to aspects, the step of gathering S51 data related to cells of RBSs having a cellular radio connection to a CGW in the capillary network further comprises any of;
  gathering cell traffic load from the RBS or RNC in control of the respective cells,
  the CNF gathering cell traffic load information directly or indirectly from the RBSs or RNCs,
  the CNF being arranged for direct interfacing to the RBSs or RNCs via an O&M interface or similar,
  the CNF being arranged to retrieve said data via a Machine Type Communication Interworking Function, MTC-IWF, and the MME/SGSN/MSC,
  the CNF being pre-configured with information relating to which RBSs and which cells from which to request said data,
  the CNF being adapted to receive information about the cell and RBS that a CGW is connected to from the respective CGW, e.g., in conjunction with the deployment of the CGW,
  the CNF being adapted to receive information about the cell and RBS a CGW is connected to from an O&M entity, such as an O&M entity dedicated for management of capillary networks or CGWs, the O&M entity having acquired information in conjunction with deployment of the CGW or through manual configuration,
  the CNF being pre-configured with said data or information about the cell and RBS a CGW is connected to from the respective RBS, the CNF being arranged to distribute the gathered cell traffic load information to CGWs connected to the same capillary network,
  any of the capillary network of the cellular network further comprising an O&M entity dedicated for management of capillary networks or CGWs, the O&M entity being arranged to gather cell traffic load information from the RBSs and to distribute it to the CGWs connected to the same capillary network,
  the RBS being adapted to transmit cell traffic load information to the respective CGW,
  each CGW in the capillary network being adapted to distribute locally obtained data related to the cell of the RBS having a cellular radio connection to the CGW to other CGWs in the capillary network.

Through some of the above described examples, aspects and variants, the cell traffic load information associated with each CGW of a capillary network is spread to all the other CGWs of the same capillary network and hence a result, or technical effect, is that all the CGWs connected to the same capillary network will be aware of the cell traffic load of the cellular network cell that each of the other CGWs are connected in. Thus, any of the CGWs can, in principle, determine which CGW the MD should connect/associate with, i.e., use for linking with the cellular network.

In this decision the CGW, according to aspects, also takes into account information about the MD, its channel quality and/or the application the MD is currently running. The CGW is, according to aspects, adapted to derive such information from observing and/or sniffing data traffic originating from the MD or from explicit information received from the MD.

Thus, according to an aspect, the step of gathering data related to cells of the respective RBSs having a cellular radio connection to the at least two CGWs further comprises spreading or distributing said data to all, or at least a subset of all, the other CGWs of the same capillary network.

Further, the step of controlling S52 selection of at least one CGW out of the at least two CGWs based on the gathered data comprises any of
  determining, by a CGW in the capillary network, at least one CGW out of the at least two CGWs based on the gathered data,
  taking into account information about the MD during determining, the information about the MD comprising any of channel quality and the application the MD is running.

According to an aspect, the CGW to which the MD is currently connected sends an instruction to the MD to connect/associate with a certain alternative CGW, provided that it is not determined that the MD should remain with the current CGW.

According to an aspect, the CGW sends the instruction in the form of a field in a Routing Protocol for Low-Power and Lossy Networks, RPL, message, as a link layer (management) message or as a parameter in a unicast IPv6 router advertisement. Other possibilities include sending the instruction in a CoAP message or an OMA-LWM2M message.

According to another aspect the MD has a relation with the CNF, meaning that the MD and CNF are communicatively coupled, or at least the MD is visible and reachable from the CNF. The CNF here gathers the cell traffic load information, as described above, and based on this information and possibly information about the MD and/or the application it is running, the CNF determines whether an MD should change to another CGW and, if so selects in step S53a the determined CGW and sends an explicit instruction to the MD in order to cause the linking to be established.

The CNF may acquire information about the MD and/or its application from the MD or the Application Server or by observing and sniffing the MD's traffic, provided that the MD's user data traffic passes through the CNF. In a slight variation of this variant, the CNF sends the instruction to the MD's current CGW instead of directly to the MD, requesting the CGW to send an instruction to the MD. This (i.e. gathering cell traffic load information and instructing the MD) may also be performed by an O&M entity, e.g. an O&M entity dedicated for management of MDs, CGWs and/or capillary networks (although this excludes access to the user data, i.e. the MD's user data traffic will not pass through the O&M entity).

Irrespective of whether the CGW, the CNF or another entity makes the CGW selection decision on behalf of an MD, the decision making entity may, depending on the scenario, have to be provided with the CGWs that are currently reachable for the MD and possibly also other contextual parameters such as the MD's channel quality to different CGWs and/or the application the MD is running. An alternative is that the MD obeys a received CGW selection instruction only if the CGW it is directed to is available to the MD or reachable with a reasonable channel quality. Yet another alternative is that the instruction has the form of a number of CGWs listed in priority order so that if the first CGW in the list is unavailable, or has too poor channel quality, the MD chooses the next CGW in the list, and so on.

Thus, according to an aspect, the step of sending S53 an instruction to the MD to link, i.e., connect or associate, to the cellular network via at least one CGW determined based on the gathered data further comprises any of the CGW to which the MD is currently connected sending an instruction to the MD to connect/associate with a certain alternative CGW, or to remain with the current CGW, the CGW to which the MD is currently connected sending the instruction to connect/associate with a certain alternative CGW, or to remain with the current CGW in the form of a field in a RPL message, as a link layer (management) message, or as a parameter in a unicast IPv6 router advertisement, the CGW to which the MD is currently connected sending the instruction to connect/associate with a certain alternative CGW, or to remain with the current CGW in a CoAP message or in an OMA-LWM2M message, the MD having a relation or connection to the CNF, the CNF sending an instruction to the MD to connect/associate with a certain alternative CGW, or to remain with the current CGW, the CNF determining whether a MD should change to another CGW and, if so, the step of causing the MD to link to the cellular network via the at least one selected CGW further comprising the CNF sending an explicit instruction to the MD causing said linkage.

the MD having a relation or connection to an O&M entity, the O&M entity sending an instruction to the MD to connect/associate with a certain alternative CGW, or to remain with the current CGW, the MD obeying a received CGW selection instruction only if the CGW it is directed to is available to the MD or reachable with a reasonable channel quality, the instruction to the MD having the form of a number of CGWs listed in priority order so that if the first CGW in the list is unavailable, or has too poor channel quality, the MD chooses the next CGW in the list.

According to some other aspects, the network exercises its control over the CGW selection process through policies and/or rules related to contextual parameters, and not necessarily by using direct instructions sent to the MD. These aspects will now be described in detail.

According to these other aspects the network exercises its control over the MD's CGW choice indirectly through policies and/or rules. These policies and/or rules are preferably configured in the MD by an O&M entity, possibly via the CNF.

Thus, according to aspects, the step S52 of controlling selection of at least one CGW, comprises setting or configuring S52b a set of policies and/or rules by the MD, which policies and/or rules indirectly determines the CGW choice made by an MD.

If the O&M entity or CNF does not have a direct relation to the MD, the configuration data is according to aspects sent to the CGW to be forwarded to the MD. In this case, one alternative is that all MDs in the capillary network are configured with the same policies and/or rules, but individually adapted policies and/or rules are preferable in order to allow different kinds of MDs/applications in the same capillary network.

One way to achieve individual policy and/or rule adaptation without sending individual policies and/or rules to different MDs in a capillary network is to take the type of MD/application into account in the policies and/or rules, i.e. making the type of MD/application a contextual parameter that is part of the input data to the policies and/or rules.

Thus, according to aspects, the step of selecting at least one CGW out of the at least two CGWs based on the gathered data comprises configuring the MD with policies and/or rules by which the MD selects CGW. The step of gathering data related to cells of the respective RBSs having a cellular radio connection to the at least two CGWs comprising forwarding configuration data to the MD via a CGW.

As implied above, the policies and/or rules take contextual parameters as input data to an algorithm that outputs a CGW choice. According to an aspect of the disclosure, the network node sends, in step S52c, at least a subset of gathered data to the MD. The MD uses the received data and/or data retrieved by the MD itself as input to the configured policies and rules. Naturally, the input data includes the available CGWs and information reflecting the cell traffic load of their respective cellular network cell, but the contextual parameters may according to aspects also include other aspects, such as the current application or software run by an MD, channel quality between the MD and the respective CGW, required transmission power, battery/energy status, location or capillary network technology used by the various CGWs.

For instance, policies and/or rules may be formulated such that the MD should switch to a certain CGW which is connected in a less loaded cellular network cell, but only if the channel quality between the MD and this CGW is good enough according to some pre-determined criterion. If the battery/energy status is poor, a policy and/or rule may also state that any change of CGW is subject to the required transmission power (e.g. not allowing increased required transmission power).

Information about the cell traffic load of the cellular network cell to which each CGW is connected is according to aspects sent from the CGW to the MD in the form of a field in an RPL message, as a link layer message, e.g. a field in a beacon message, or as a parameter in a broadcast or unicast IPv6 router advertisement. This information may be explicit descriptions of the QoS class/parameters of each EPS bearer, or corresponding type of bearer in other cellular systems than EPS, associated with the CGW or information about the load on these bearers, but it may also be information in more condensed forms, e.g. a preference value. In this context "preference value" is to be construed as a generic designation for a parameter, whose purpose is to reflect how attractive a CGW should be considered in a CGW selection procedure. The preference value thus summarizes one or more properties/capabilities of the CGW. In this context certainly including the load of the cellular network cell the CGW is connected in and possibly also other properties.

Each CGW, according to aspects, creates the cell traffic load information and/or derivatives thereof independently of the other CGWs, including setting of a possible preference value. However, an alternative is that the CGWs are made aware of the load of each other's cellular network cell, in any of the manners described above, and derives cell traffic load information and/or derivatives thereof to be sent to the MD(s), e.g. preference values, in a process where the concerned cell traffic load of all CGWs are taken into account, e.g., to derive relative preference values. It is also possible that the CNF (or an O&M entity) provides the CGWs with the condensed cell traffic load information, e.g. preference values, which the CGWs should deliver to the MDs. Yet another option is that the CNF (or O&M entity) sends the information directly to the MDs.

Thus, according to an aspect, providing information to the MD about a CGW determined to be eligible for linking the MD to the cellular network based on the gathered data further, comprises any of

- each of the CGWs creating RBS cell traffic load information and/or derivatives thereof independently of the other CGWs, including setting of a possible preference value.
- each of the CGWs being made aware of the load of each other's cellular network cell,
- each of the CGWs being adapted to derive cell traffic load information and/or derivatives thereof to be sent to a connected MD, said derivatives thereof taking the concerned cell traffic load of all CGWs into account to derive relative preference values.
- the CNF or O&M entity providing the CGWs with condensed cell traffic load information, the condensed cell traffic load information comprising preference values for delivery to MDs.

According to aspects of the methods disclosed herein, any of the methods further comprises the step of load balancing by a central or a distributed network entity, by providing information to the MD on a load balance state of the cellular network, the information relevant for the determined at least one CGW.

By the teachings of the present disclosure, improvements in the CGW selection in capillary networks is achieved by taking additional information into account when making the decision, such as RBS cell traffic load, in particular the load of the cells in which the selectable CGWs are connected. The current teaching further enables the network to have more control of the MD's choice of CGW. In addition to being beneficial for the MD itself, there is also provided means for load balancing between cells in the cellular network.

Figure 6:
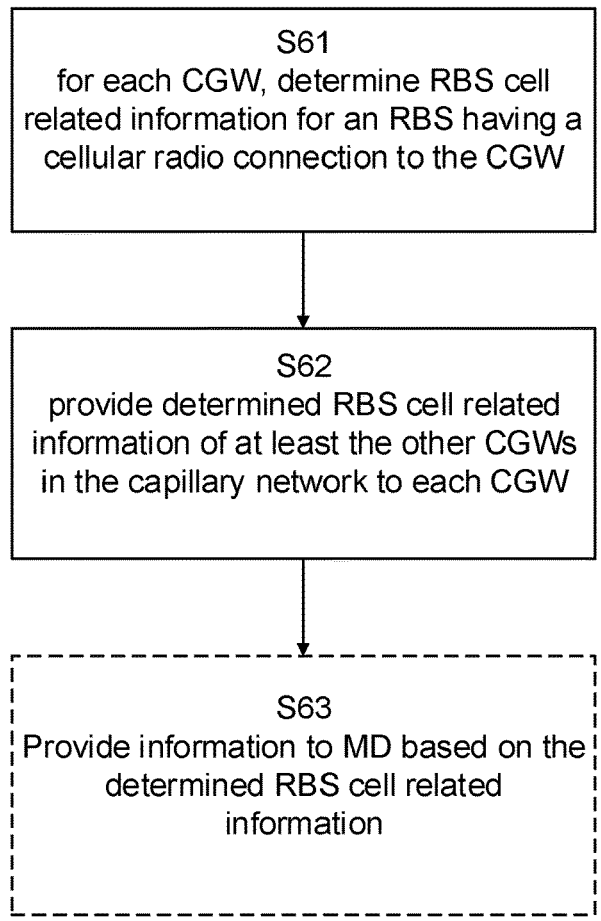
FIG. 6 is another flowchart schematically illustrating embodiments of method steps performed in a network node

FIG. 6 shows a flowchart schematically illustrating embodiments of method steps performed in a network node. In particular, there is shown a method, performed in a network node, of selecting a capillary network gateway, CGW, for linking a machine device, MD, arranged to operate according to a local area access technology in a capillary network, to a cellular network. The capillary network includes at least two CGWs, wherein each CGW is arranged to operate according to a local area access technology in the capillary network and to operate according to a cellular radio access technology in the cellular network. Each CGW has a cellular radio connection to a radio base station, RBS, of the cellular network. The method comprises the steps of, for each CGW, determining S61 RBS cell related information for an RBS having a cellular radio connection to the CGW and providing S62 the determined RBS cell related information of the CGW to the other CGWs in the capillary network. The method also comprises providing information S63 to the MD based on the determined RBS cell related information. According to an aspect of the disclosure, the RBS cell related information is a component of the data gathered in step S51.

According to an aspect, the RBS cell related information includes RBS cell traffic load, e.g. traffic load of the cell in which the CGW is connected to an RBS.

Thus, since the present teaching proposes taking traffic load in the cellular network cell in which the CGW is connected into account in the CGW selection, advantageous effects are obtained. For instance, the present teaching allows an MD to select or be directed to a CGW which is connected to the least loaded cell among a group of cells, or to a cell with excess capacity, i.e., a cell which is not already fully loaded or has a load low enough to allow ample CGW transmission resources.

In addition to being beneficial for the MD itself, this feature of taking traffic load in the cellular network cell in which the CGW is connected into account in the CGW selection process may also be used for load balancing between cells in the cellular network.

According to another aspect, the step of determining RBS cell traffic load includes receiving RBS cell traffic load information from an operation and maintenance, O&M, entity. The RBS cell traffic load information may include traffic load pertaining only to a cell or cells in which at least one CGW of the capillary network is connected in each of the cell(s) or, alternatively, the RBS cell information of an RBS may include traffic load pertaining to all the cells controlled by the RBS, such that the traffic load from a combination of the cells constitute the total traffic load experienced by the RBS.

Thus, a control mechanism is provided which enables the O&M entity to influence CGW selection, which is an advantage.

According to one aspect, the method further includes determining one or more dynamic properties for each CGW and providing the determined one or more dynamic properties for at least the other CGWs in the capillary network to each CGW; as well as selecting at least one CGW out of the at least two CGWs based on a combination of the RBS cell related information and the determined one or more dynamic properties. The method optionally also comprises the step S63 of providing information to the MD to link to the cellular network via the at least one selected CGW by setting up a local area connection to the selected CGW.

Thus, by including the steps of determining one or more dynamic properties for each CGW and selecting at least one CGW out of the at least two CGWs based on a combination of the RBS cell related information and the determined one or more dynamic properties the MD select or be directed to the CGW which will provide the most efficient traffic processing and forwarding or which is the most beneficial from some other aspect, e.g. MD battery/energy efficiency or cost of transmission resources.

According to an aspect, the one or more dynamic properties comprises any of traffic load experienced by each CGW, channel quality of the cellular radio connection for the CGW, and cellular radio access technology of the cellular network.

Consequently, the present disclosure improves on the CGW selection mechanisms in capillary networks by taking additional information into account when making the CGW selection decision. It also enables the network to have more control of the MD's choice of CGW, enabling steering of MDs to CGWs with suitable combination of load, cellular radio channel quality and/or cellular RAT, which will enable more efficient processing and forwarding of traffic.

According to another aspect, the method further includes the step of calculating a preference value for each CGW based on the combination of RBS cell related information and the determined one or more dynamic properties, and the step of selecting at least one CGW out of the at least two CGWs also comprises selecting at least one CGW out of the at least two CGWs based on the calculated preference value.

According to a further aspect, the step of causing the MD to link to the cellular network via the at least one selected CGW by setting up a local area connection to the selected CGW comprises instructing the MD to set up a local area connection to a specified CGW.

Thus, there is disclosed a mechanism which allows external control of the CGW selection, which is an advantage.

According to one aspect, the step of causing the MD to link to the cellular network via the at least one selected CGW by setting up a local area connection to the selected CGW further comprises instructing the MD to predict a channel quality of the local area connection.

According to another aspect, the step of selecting at least one CGW out of the at least two CGWs comprises instructing the MD to perform a selection of a CGW.

According to an aspect, the step of selecting at least one CGW out of the at least two CGWs comprises providing one or more policies and/or rules for CGW selection to the MD.

According to an aspect, all MDs of the capillary network are provided with the same policies and/or rules.

According to an aspect, a policy and/or rule for CGW selection is based on MD application parameters.

According to an aspect, the network node is a capillary network function, CNF, arranged to control CGWs of one or more capillary networks.

According to an aspect, the step of causing the MD to link to the cellular network via the at least one selected CGW includes providing instructions in a field in an RPL message in a link layer message, such as a beacon message, in a unicast Ipv6 router advertisement, in a CoAP message or in an OMA-LWM2M message.

Figure 7:
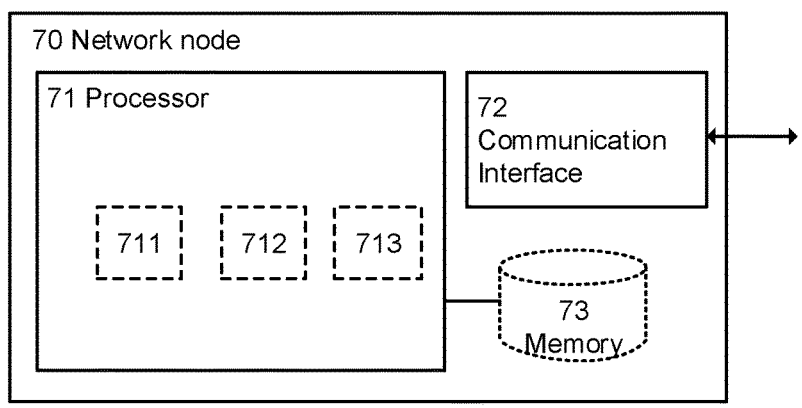
FIG. 7 is a block diagram schematically illustrating a network node for performing method steps.

FIG. 7 is a block diagram schematically illustrating a network node for performing method steps. In particular, there is shown a network node 70 arranged to select a capillary network gateway, CGW, for linking a machine device, MD, arranged to operate according to a local area access technology in a capillary network, to a cellular network. The network node comprising a processor 71, a communication interface 72 and a memory 73. The memory containing instructions executable by said processor whereby the network node is operative to: for each CGW, determining RBS cell related information for the RBS having a cellular radio connection to the CGW and providing the determined RBS cell related information of the CGW to the other CGWs in the capillary network, as well as to cause the MD to set up a local area connection to a CGW based on the determined RBS cell related information. The RBS cell related information may include traffic load pertaining only to a cell or cells in which at least one CGW of the capillary network is connected in each of the cell(s) or, alternatively, the RBS cell related information may include traffic load pertaining to all the cells controlled by the RBS, such that the traffic load from the all the cells combined, constitute the total traffic load experienced by the RBS.

According to an alternative, the network node 70 shown in FIG. 7 is arranged to select a capillary network gateway, CGW, for linking of a machine device, MD, arranged to operate in a capillary network, to a cellular network, the capillary network including at least two CGWs, each of which CGWs being adapted to forward traffic between the capillary network and a respective radio base station, RBS, of the cellular network. The network node comprising a processor 71, a communications interface 72 and a memory 73. The memory containing instructions executable by said processor whereby the network node is operative to: gather data related to cells of the respective RBSs having a cellular radio connection to the at least two CGWs; and select at least one CGW out of the at least two CGWs based on the gathered data; and also cause the MD to link to the cellular network via the at least one selected CGW. The data may include traffic load pertaining only to a cell or cells in which at least one CGW of the capillary network is connected in each of the cell(s) or, alternatively, traffic load pertaining to all the cells controlled by the RBS.

According to one aspect of the disclosure the processor comprises one or several of:
  a first gathering module 711 configured to determine one or more dynamic properties for at least two CGWs in the capillary network,
  a selection control module 712 configured to control selection of at least one CGW out of the at least two CGWs based on the determined dynamic properties; and
  a link initiation module 713 configured to provide information to the MD on the selected at least one CGW and/or to instruct the MD to link to the cellular network via the at least one selected CGW.

The modules 711 to 713 are implemented in hardware or in software or in a combination thereof. The modules 711 to 713 are according to one aspect implemented as a computer program stored in the memory 73 which runs on the processor 71. The network node 70 is further configured to implement all the aspects of the disclosure as described in relation to the methods above.

According to an aspect, the network node is a capillary network function, CNF, and the network node further includes a communication interface to at least one operation and maintenance, O&M, entity.

Figure 8:
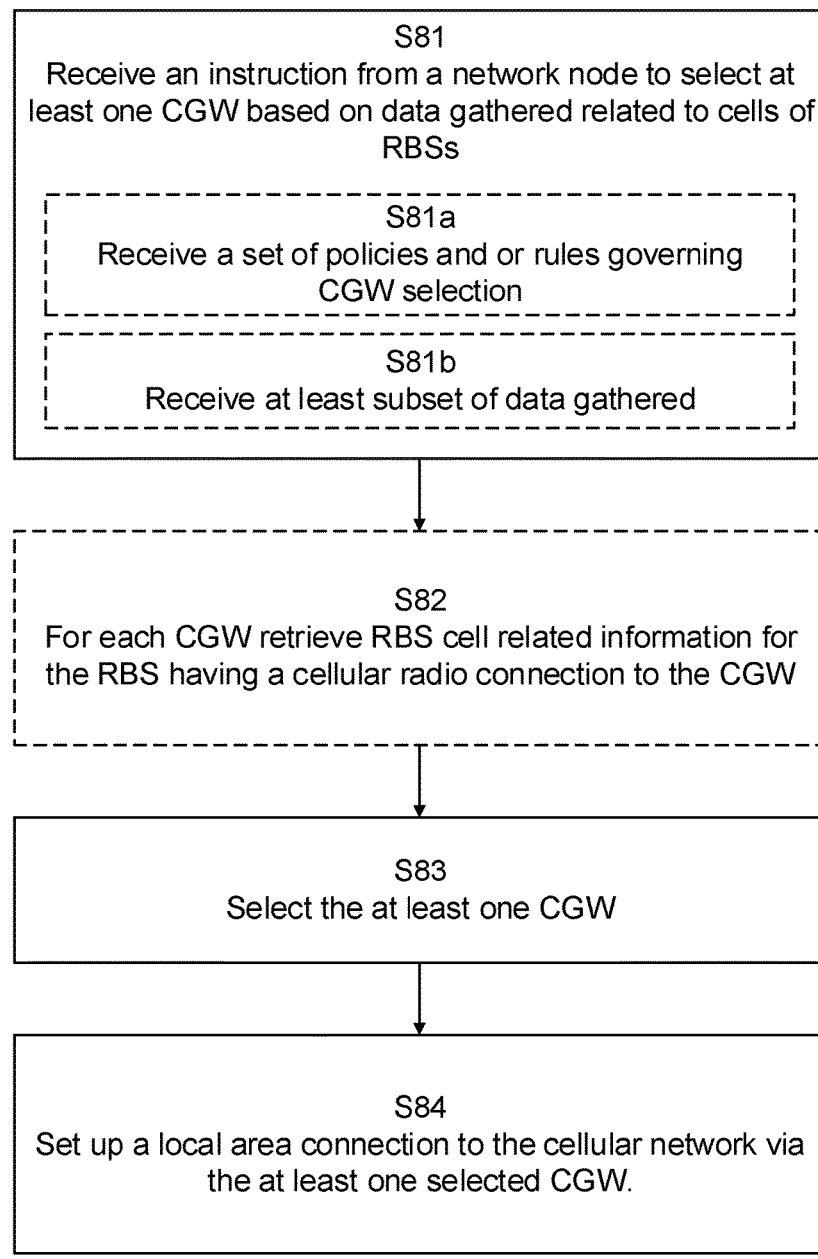
FIG. 8 is a flowchart schematically illustrating embodiments of method steps performed in a machine device

FIG. 8 shows a flowchart schematically illustrating embodiments of method steps performed in a machine device. In particular, there is shown a method, performed in a machine device, MD, arranged to operate according to a local area access technology in a capillary network of selecting a capillary network gateway, CGW, for linking the MD to a cellular network. The capillary network includes at least two CGWs, wherein each CGW is arranged to operate according to a local area access technology in the capillary network and to operate according to a cellular radio access technology in the cellular network and each CGW has a cellular radio connection to a radio base station, RBS, of the cellular network. The method comprises the steps of receiving S81 an instruction from a network node to select at least one CGW based on gathered data related to cells of the RBSs having a cellular connection to the respective CGW in the capillary network. In an optional step S81a, the MD is configured with a set of policies and/or rules governing CGW selection; the policies and/or rules received from the network node. According to a further aspect, the MD receives at least a subset of the data gathered related to the cells of RBSs having a cellular radio connection to the respective CGW. As disclosed in step S82, the MD is also capable of retrieving RBS cell related information, e.g. from the network node or from the According to one aspect of the disclosure, the above disclosed network node exercises control over the MDs choice of CGW through explicit instructions to the MD, such as an instruction to the MD to connect/associate with a selected CGW. The instruction could be sent to the MD from a currently connected CGW or possibly by a capillary network function, CNF, as previously disclosed. The CGW to which the MD is currently connected sends the instruction to the MD to connect/associate with a certain selected CGW. The CGW could send the instruction in the form of a field in an RPL message, such as a link layer message or as a parameter in a unicast IPv6 router advertisement, in a CoAP message or in an OMA LWM2M message.

According to another aspect of the disclosure, the network exercises its control over the CGW selection indirectly through policies and/or rules. These policies and/or rules are preferably configured in the MD by an O&M entity, possibly via the CNF. The CGW selection related information of each CGW is sent from the CGW to the MD in the form of a field in an RPL message, as a link layer message, e.g. a field in a beacon message, or as a parameter in a broadcast or unicast IPv6 router advertisement, as a parameter in a CoAP message or as a parameter in an OMA LWM2M message. This information may be explicit descriptions of the load, cellular radio channel quality and/or cellular RAT associated with the CGW that the MD retrieves upon reception, but it may also be information in more condensed forms, e.g. a preference value.

Even though the MD may receive explicit instructions to select a certain CGW, it is the MD itself that executes the CGW selection. Consequently, in step S83, the MD selects the at least one CGW, either based on explicit instructions from the network, or based on applying the policies and/or rules. As illustrated in the optional step S82, the MD retrieves RBS cell related information for the RBS having a cellular connection to the CGW. According to an aspect, the cell related information for the RBS is the cell traffic load of the cell in which the CGW is connected to the RBS. According to another aspect, the cell related information for the RBS is the combined cell traffic load of all the cells controlled by the RBS, thus constituting the total traffic load experienced by the RBS.

According to an aspect, the step S82 of retrieving cell related information further includes retrieving one or more dynamic properties for the CGW. According to an aspect, the one or more dynamic properties comprises load experienced by each CGW, channel quality of the cellular radio connection for the CGW, and/or cellular radio access technology of the cellular network.

According to an aspect, the step of setting up a local area connection to a CGW comprises receiving instructions from a network node to set up the connection to a specified CGW.

According to an aspect, the step of setting up a local area connection to a CGW comprises receiving instructions from a network node on how to select a CGW.

According to an aspect, the step of setting up a local area connection to a CGW is based on one or more policies and/or rules for CGW selection stored in the MD.

According to an aspect, the one or more policies for CGW selection include a policy and/or rule based on MD application parameters.

In a variant the MD has a relation with the CNF, or at least the MD is visible and reachable from the CNF. In this variant the CNF either retrieves the RBS cell related information, also known as CGW choice related information, from the CGWs or is inherently aware of it. Based on this information and possibly information about the MD and/or the application it is running, the CNF determines whether the MD should change to another CGW and, if so, sends an explicit instruction to the MD. The CNF may acquire information about the MD and/or its application from the MD or the Application Server or by observing and sniffing the MD's traffic, provided that the MD's user data traffic passes through the CNF. In a slight variation of this variant, the CNF sends the instruction to the MD's current CGW instead of directly to the MD, requesting the CGW to send an instruction to the MD.

It would also be possible to replace the CNF with a pure O&M entity, such as an O&M entity dedicated for management of MDs, CGWs and/or capillary networks. Both the CNF and an O&M entity may also be involved simultaneously. For instance an O&M entity may gather the CGW choice related information and pass it to the CNF, so that the CNF may distribute the information to the CGWs of the capillary network. Alternatively, the CNF may use the CGW choice related information received from the O&M entity to determine the most suitable CGW and/or send an instruction accordingly to the MD or the MD's current CGW. It is also conceivable, that the CNF and the O&M entity would have the opposite roles in such a cooperation, i.e. the CNF gathering the CGW choice related information and passing it to the O&M for further distribution or CGW selection triggering.

In solution variants where the CNF or an O&M entity gathers the CGW choice related information, the RBS cell related information could be retrieved from the RBS. If so, the O&M entity may use a management interface towards the RBS. The CNF could also have a direct interface towards the RBS, but if the CNF is integrated with the SCS, then a more likely path for the information retrieval could be via the MTC-IWF and the MME, SGSN and/or MSC.

Following the selection of the at least one CGW, the MD performs the step S84 of setting up a local area connection to a selected CGW. The MD could of course have more than one local area connection. In such case, the MD may set up two or more local area connections, e.g. to respective CGWs. As was disclosed above, the step S84 of setting up a local area connection to a CGW comprises receiving instructions from a network node to set up the connection to a selected CGW, but could also comprise receiving instructions from a network node on how to select a CGW, e.g. based on one or more policies and/or rules for CGW selection stored in the MD. According to an aspect of the disclosure, such policies and/or rules for CGW selection includes a policy and/or rule based on MD application parameters.

According to a further aspect of the disclosure, irrespective of whether the CGW, the CNF or another entity makes the CGW selection decision on behalf of an MD, the decision making entity is provided with the CGWs that are currently reachable for the MD and possibly also other contextual parameters such as the MD's channel quality to different CGWs, the CGWs' channel quality to their respective RBS and/or the application the MD is running. An alternative could be that the MD obeys a received CGW selection instruction only if the CGW it is directed to is available to the MD or reachable with a reasonable channel quality. Yet another alternative is that the instruction has the form of a number of CGWs listed in priority order so that if the first CGW in the list is unavailable, or has too poor channel quality, the MD chooses the next CGW in the list, and so on.

Figure 9:
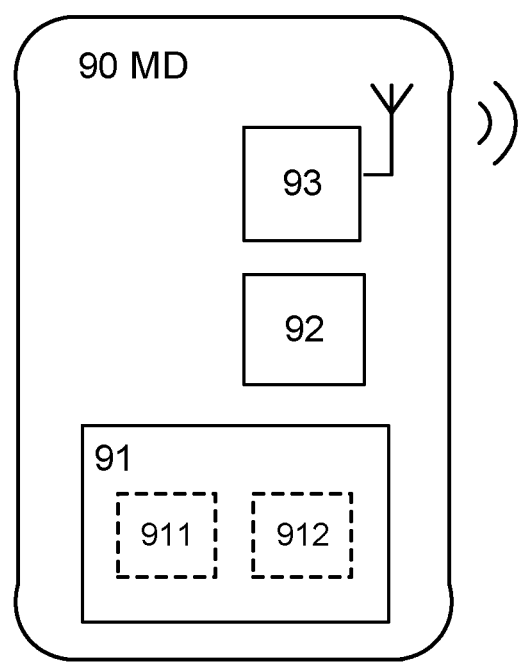
FIG. 9 is a block diagram schematically illustrating a machine device for performing method steps.

FIG. 9 is a block diagram schematically illustrating some modules of an exemplary embodiment of a machine device, MD, 90 for performing the method steps. The machine device 90, comprises a processor or processing circuitry 91 that may be constituted by any suitable Central Processing Unit, CPU, microcontroller, Digital Signal Processor, DSP, etc. capable of executing computer program code. The computer program may be stored in a memory, 92. The memory 92 can be any combination of a Random Access Memory, RAM, and a Read Only Memory, ROM. The memory 92 may also comprise persistent storage, which, for example, can be any single one or combination of magnetic memory, optical memory, or solid state memory or even remotely mounted memory.

The MD 90 further comprises radio circuitry 93. However, even though an radio communication interface is illustrated for the MD, the principles of the disclosure are also applicable to a wired interface and the previously discussed method performed in machine device is not limited to a machine device including a radio circuitry. The radio circuitry 93 is configured to provide a radio communication interface for wireless communication with gateways of a capillary network providing a link between the capillary network and a cellular network. The radio circuitry 93 is adapted to receive an instruction from a network node to select at least one capillary network gateway CGW for setting up a local area connection. The received instruction is processed in the processor 91.

According to one aspect the disclosure further relates to a computer-readable storage medium, having stored thereon a computer program which when run in an MD 90 causes the MD to perform any of the aspects of the method described above. When the computer readable code is run in the processor 91 of the MD 90, it causes the MD 90, to determine one or more dynamic properties to perform the received instruction, to select S83 at least one CGW based on the determined one or more dynamic properties, and to set up S84 a local area connection to the at least one selected CGW.

According to one aspect of the disclosure the processor comprises one or several of:
- a selection module 911 configured select at least one CGW based on the received instruction; and
- a connection establishment module 912 configured to set up a local area connection to the at least one CGW.

The modules 911 and 912 are implemented in hardware or in software or in a combination thereof. The modules 911 and 912 are according to one aspect implemented as a computer program stored in the memory 93 which runs on the processor 91. The machine device 90 is further configured to implement all the aspects of the disclosure as described in relation to the methods above.

The foregoing description of scenarios and example embodiments has been presented for purposes of illustration and description and is not intended to be exhaustive or to limit example embodiments to the precise form disclosed. Modifications and variations of the disclosed example embodiments are within the scope of the disclosure. The examples discussed herein were chosen and described in order to explain the principles and the nature of various example embodiments and its practical application to enable a person skilled in the art to utilize the example embodiments in various manners and with various modifications as are suited to the particular use contemplated. The features of the embodiments described herein may be combined in all possible combinations of methods, apparatus, modules, systems and computer program products.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a machine device (MD) of selecting a capillary network gateway (CGW) for linking the MD to a cellular network, wherein the MD operates according to a local area access technology in a capillary network, and wherein the capillary network comprises a plurality of CGWs that each have a connection to the cellular network, the method comprising:

receiving, at the MD, an instruction from a network node to select at least one CGW from the plurality of CGWs in the capillary network;

selecting, by the MD, the at least one CGW from the plurality of CGWs in the capillary network, based on data gathered related to cells of radio base stations (RBSs) having a cellular radio connection to a respective CGW in the capillary network; and setting up, by the MD, a local area connection to the selected at least one CGW.

2. The method of claim 1, wherein receiving the instruction from the network node comprises: receiving a set of policies and/or rules governing CGW selection by the MD, and receiving at least a subset of the gathered data from the network node.

3. The method of claim 2, further comprising:

for each CGW, retrieving RBS cell related information for the RBS having the cellular radio connection to the CGW.

4. The method of claim 3, wherein the retrieved RBS cell related information is cell traffic load.

5. The method of claim 4, wherein the cell traffic load is a traffic load in one or more cells served by the RBS in which at least one of the plurality of CGWs in the capillary network is connected to the RBS, or wherein the cell traffic load is a combined traffic load of all the cells served by the RBS.

6. The method of claim 3, wherein retrieving further includes retrieving one or more dynamic properties for each CGW, and wherein selecting the at least one CGW is based on a combination of the RBS cell related information and the one or more dynamic properties.

7. The method of claim 6, wherein the one or more dynamic properties comprise: load experienced by each CGW, channel quality of the cellular radio connection for each CGW, and/or cellular radio access technology for each CGW connection to the cellular network.

8. The method of claim 1, wherein setting up the local area connection to the selected at least one CGW comprises receiving instructions from the network node to set up the local area connection to a specified CGW.

9. The method of claim 1, wherein selecting the at least one CGW is based on one or more policies and/or rules stored in the MD for CGW selection.

10. A machine device (MD) arranged to select a capillary network gateway (CGW) for linking the MD to a cellular network, the MD operating according to a local area access technology in a capillary network comprising a plurality of CGWs, the MD comprising a processor, radio circuitry and a memory, said memory containing instructions executable by said processor, whereby the MD is operative to:

receive an instruction from a network node to select at least one CGW from the plurality of CGWs in the capillary network;

select the at least one CGW from the plurality of CGWs in the capillary network, based on data gathered related to cells of radio base stations (RBSs) having a cellular radio connection to a respective CGW in the capillary network; and set up a local area connection to the cellular network via the selected at least one CGW.

* * * * *